United States Patent
Jagota et al.

(10) Patent No.: US 10,628,384 B2
(45) Date of Patent: Apr. 21, 2020

(54) OPTIMIZED MATCH KEYS FOR FIELDS WITH PREFIX STRUCTURE

(71) Applicant: salesforce.com, inc., San Francisco, CA (US)

(72) Inventors: Arun Kumar Jagota, Sunnyvale, CA (US); Dmytro Kudriavtsev, Belmont, CA (US); Pawan Nachnani, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 721 days.

(21) Appl. No.: 15/374,924

(22) Filed: Dec. 9, 2016

(65) Prior Publication Data
US 2018/0165294 A1    Jun. 14, 2018

(51) Int. Cl.
| | |
|---|---|
| G06F 7/00 | (2006.01) |
| G06F 17/00 | (2019.01) |
| G06F 16/17 | (2019.01) |
| G06F 16/16 | (2019.01) |
| G06F 16/901 | (2019.01) |

(52) U.S. Cl.
CPC ........ G06F 16/1727 (2019.01); G06F 16/164 (2019.01); G06F 16/9027 (2019.01)

(58) Field of Classification Search
CPC .............. G06F 16/1727; G06F 16/164; G06F 16/9027; G06F 17/30138; G06F 17/3012
USPC .......................................................... 707/687
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

U.S. Appl. No. 13/986,251, filed Apr. 16, 2013.

*Primary Examiner* — Binh V Ho
(74) *Attorney, Agent, or Firm* — Dergosits & Noah LLP; Todd A. Noah

(57) ABSTRACT

The system tokenizes values stored by records' fields, creates trie from tokenized values, each branch labeled with tokenized value, each node storing count indicating number of records associated with tokenized value sequence beginning from trie root. The system tokenizes value stored by record field, identifies nodes, beginning from trie root, corresponding to token value sequence associated with tokenized value, until node is identified that stores count that is less than node threshold. The system identifies branch sequence comprising each identified node as record's key, and associates key with node storing count less than node threshold, and record with key. The system tokenizes prospective value stored by prospective record's field, identifies nodes, beginning from trie root, corresponding to another token value sequence associated with tokenized prospective value, until another node is identified that stores another count that is less than node threshold. The system identifies other node's key as prospective record's key, identifies existing record that matches prospective record by using prospective record's key.

20 Claims, 4 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0210014 A1* | 9/2005 | Asano ................ G06F 21/10 |
| 2006/0271573 A1* | 11/2006 | LeTourneau ......... G06F 16/322 |
| 2007/0067622 A1* | 3/2007 | Nakano ............... H04L 9/0822 |
| | | 713/163 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0143923 A1* | 6/2012 | Whitney ............... G06F 16/907 |
| | | 707/803 |
| 2012/0233137 A1 | 9/2012 | Jakobson et al. |
| 2013/0138698 A1* | 5/2013 | Harada ............... G06F 21/6254 |
| | | 707/797 |
| 2013/0173520 A1* | 7/2013 | Clemencon ............. G06N 5/02 |
| | | 706/46 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0201838 A1* | 7/2014 | Varsanyi ............... G06F 21/552 |
| | | 726/23 |
| 2014/0359537 A1 | 12/2014 | Jakobson et al. |
| 2015/0007050 A1 | 1/2015 | Jakobson et al. |
| 2015/0046464 A1* | 2/2015 | Raiber ................ G06F 16/2246 |
| | | 707/741 |
| 2015/0095162 A1 | 4/2015 | Jakobson et al. |
| 2015/0172563 A1 | 6/2015 | Jakobson et al. |

\* cited by examiner

US 10,628,384 B2

OPTIMIZED MATCH KEYS FOR FIELDS WITH PREFIX STRUCTURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects or records for each person or organization that may be able to help in achieving a goal. Each record can consist of a few standard fields, such as first name, last name, company name, job title, address, telephone number, e-mail address, fax number, and mobile phone number. For performant matching of a record against a large database of records, the database records need to be indexed. A database system can use indices to quickly identify match candidates for the record to be matched, which may be referred to as a suspect record or a prospect record. The design of match keys takes recall and performance into consideration. Recall is the percentage of actual matching records that are identified by a database system. To achieve the ideal of 100% recall, a database system may need to treat every record in the database as a candidate for every suspect, which typically is not feasible, performance-wise. At the other extreme of the recall/performance spectrum, a database system can quickly search records by using narrowly focused match keys, but narrowly focused match keys may fail to identify some matching records.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
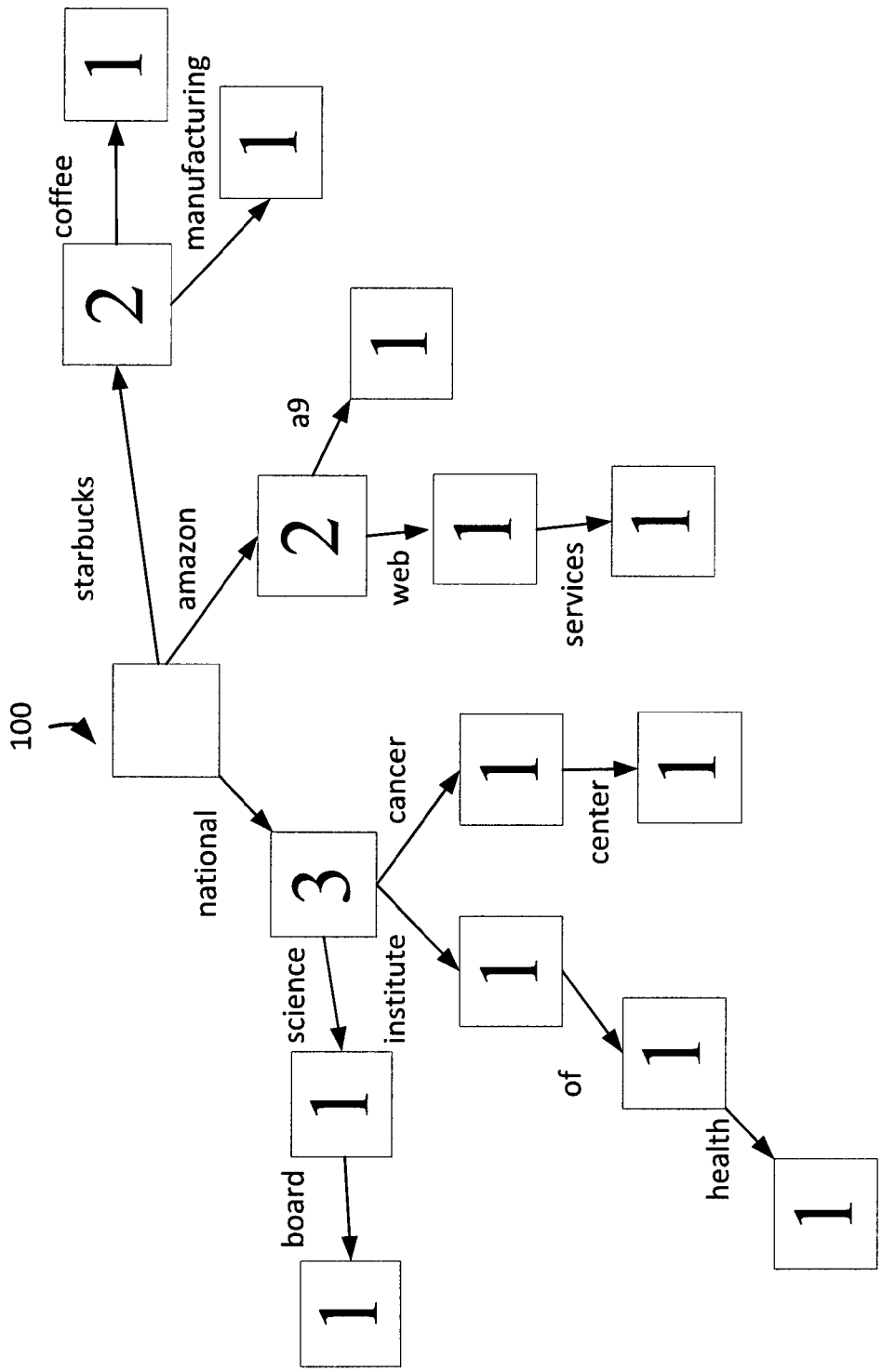
FIG. 1 illustrates an example trie used for optimized match keys for fields with prefix structure, in an embodiment.

Systems and methods are provided for optimized match keys for fields with prefix structure. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for optimized match keys for fields with prefix structure will be described with reference to example embodiments. The following detailed description will first describe a method for optimized match keys for fields with prefix structure.

In accordance with embodiments described herein, there are provided systems and methods for optimized match keys for fields with prefix structure. A database system tokenizes values stored in a corresponding field by records. The database system creates a trie from the tokenized values, each branch in the trie labeled with a corresponding tokenized value, each node storing a corresponding count indicating a number of records associated with a corresponding tokenized value sequence beginning from a root of the trie. The database system tokenizes a value stored in the field by a record. The database system identifies each node, beginning from the root of the trie, corresponding to a token value sequence associated with the tokenized value, until a node is identified that stores a count that is less than a node threshold. The database system identifies a branch sequence comprising each identified node as a key for the record. The database system associates the key with the node storing the count less than the node threshold, and the record with the key. The database system tokenizes a prospective value stored in the field by a prospective record. The database system identifies each node, beginning from the root of the trie, corresponding to another token value sequence associated with the tokenized prospective value, until another node is identified that stores another count that is less than the node threshold. The database system identifies a key associated with the other node as a key for the prospective record. The database system identifies, using the key for the prospective record, an existing record, in the records, that matches the prospective record.

For example, the database system tokenizes National Institute of Health as <national, institute, of health>, National Cancer Center as <national, cancer, center>, and National Science Board as <national, science, board> for database records during a trie creating phase. The database system creates a trie that includes a branch labelled national from the trie root to a first sequential node; branches labelled institute, cancer, science from the first sequential node to the second sequential nodes; branches labelled of, center, and board from the second sequential nodes to the third sequential nodes, and a branch labelled health from a third sequential node to a fourth sequential node. The first sequential node stores the count 3 for the 3 organization names that include national, the second sequential nodes each store the count 1 for the 1 corresponding organization name that includes institute, cancer, or science, the third sequential nodes each store the count 1 for the 1 corresponding organization name that includes of, center, or board, and the fourth sequential node stores the count 1 for the 1 organization name that includes health. The database system tokenizes National Institute of Health as <national, institute, of health> for a database record during an indexing phase. The database system uses these tokenized values to identify that a first sequential node stores the count 3 for the token value sequence national, and stop after identifying that a second sequential node stores the count 1 for the token value sequence national, institute, because this second sequential node's count 1 is less than the threshold value of 2.5. The database system identifies the branch sequence national, institute as the key for the database record that stores the organization name The National Institute of Health. The database system tags the second sequential node which follows the institute branch with the key national institute, and adds the database record that stores the organization name The National Institute of Health to a list for the key national institute. The database system tokenizes National Institute of Hlth as <national, institute, of hlth> for a prospective record during a lookup phase. The database system uses these tokenized values to identify that a first sequential node stores the count 3 for the token value sequence national, and stop after identifying that a second sequential node stores the count 1 for the token value sequence national, institute, because this second sequential node's count 1 is less than the threshold value of 2.5. The database system identifies the branch sequence national, institute as the key for the prospective record that stores the organization name The National Institute of Hlth. The database system uses the key national institute for the prospective record to identify that the database record that stores the organization name The National Institute of Health matches the prospective record that stores the organization name The National Institute of Hlth. The database system was able to identify the records as matching, even though their organization names did not match exactly, using a key based on only the first 2 of the prospective record's 4 tokenized values.

While one or more implementations and techniques are described with reference to an embodiment in which optimized match keys for fields with prefix structure is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The disclosed database system creates optimized match keys for fields having a prefix structure. A prefix structure can be a field value that includes a sequences of tokens, in which the sequencing order is important. Examples of such fields include zip codes, telephone numbers, organization names, city names, and street addresses. The database system creates an index for such a field and identifies the key values that cast as wide a net as possible, subject to performance constraints, which can result in some key values being shorter than other key values. For example, zip code-based keys for higher-density areas of the USA may use all five digits, while zip code-based keys for in lower-density areas may use only the first three digits. Therefore, the zip code-based keys that use only the first three digits will thus tolerate errors in the last two digits.

The database system executes three phases, a build phase, an index-time use phase, and a lookup-time use phase. During the build phase, the database system uses tokenized values of a field in the database to build or create a trie data structure that is used by subsequent phases. The trie is a tree of prefix sequences found in the field, with, every branch labeled by a token value. A root-to-node path yields a sequence of tokens, which is formed by concatenating the labels of all the branches in the path, starting from the root. The database system stores into each node the count of records in the database in which this field's value has that particular prefix sequence. When the database system receives a new field value, the database system references the trie for the field to identify the path that is the field value's unique prefix. If the prefix does not extend to the end of the full sequence, then the database system extends the trie so that the field value's unmatched suffix becomes a path below the current path. Next, the database system increments the counts for all nodes in this path by 1. The database system does not need to be fully build a trie, as the database system can freeze a node if the node's post-list size is less than a parameter s. The database system will not subsequently extend a frozen node.

FIG. 1 depicts an example of a trie 100 that the database system creates based on the following example field values tokenized at the word level. The organization name National Institute of Health is tokenized as <national, institute, of health>, the organization name National Cancer Center is tokenized as <national, cancer, center>, the organization name National Science Board is tokenized as <national, science, board>, the organization name Amazon A9 is tokenized as <amazon, a9>, the organization name Amazon Web Services is tokenized as <amazon, web, services>, the organization name Starbucks Coffee is tokenized as <starbucks, coffee> and the organization name Starbucks Manufacturing is tokenized as <starbucks, manufacturing>. The tie 100 is an extremely simplified trie 100 because such a trie in a production environment may include thousands of nodes and branches, which would be far too complex for depiction in this figure.

The database system identifies a key for the organization name The National Institute of Health that is as short a prefix as reasonably possible, which maximizes the ability to cope with errors and abbreviations in the organization name. First, the database system considers the prefix national as the potential key, when examining the trie 100, which indicates that there are too many records whose organization name begins with national. When the database system considers national institute as the potential key, the trie 100 indicates that there are a manageable number of records whose organization name begins with national institute. Therefore, the database system uses national institute as the key for the organization name The National Institute of Health.

If the database system receives a new record for matching with the database's records, and the new record includes the organization name The National Institute of Hlth, the database system goes through the same procedure with the trie 100 and again identifies national institute as the key for the new record. Therefore, records with either the full organization name or the abbreviated organization name will have the same value for the organization name index, allowing them to be grouped together for matching.

Zip/Postal code values are examples of fields with a prefix structure. Prefixes of zip codes correspond to broader geographic areas, at least for USA zip codes and Canadian postal codes. Telephone number values are also examples of fields with a prefix structure. Prefixes of telephone numbers generally correspond to broader instances, in geographic area or population. Organization names are examples of fields with a prefix structure because the least informative words, which may be referred to as stop words, tend to be the rightmost words in an organization name, such as Inc., Corp., and LLC., while the most informative words tend to be at the beginning of the organization name. For example, in the organization name Cisco Systems, Cisco is more informative than Systems. USA street addresses have a prefix structure because they have a sequential structure, with the most common pattern: <street number> <street name> <street suffix>.

The database system exploits prefix structure not only because there is a simple and elegant way to capture post-list sizes of prefixes (which are used at index time to optimize the keys) but also because fuzzy variations tend to be in the suffixes of fields with a prefix structure. For example, for zip codes and telephone numbers of matching records (such as contacts or accounts) the tail is more likely to differ than the head. This may be because people and companies tend to move in nearby locations, or a person gets assigned a new telephone number with the same three digit area code and the same three digit central office code, but with a different four digit station number. In organization name fields, stop words that are in the suffixes, such as Inc., Corp., and LLC., are more likely to be left off than the first word in the organization name. In USA street addresses, the content in the tail, such as suite number or floor number, is more likely to be left off than the content in the head of the street address.

The database system can use a normalizer to detect and strip away blanks in a field value, which often occur in Canadian and British postal codes. The database system can also use a normalizer to detect and strip away international codes, and non-digit characters from telephone numbers. The database system may tokenize zip codes and telephone numbers at the level of individual characters, and tokenize an organization name and street addresses at the level of words, or at the level of syllables.

A USA telephone number is in the format XXX-YYY-ZZZZ, where XXX is the area code, YYY is the central office code, and ZZZZ is the station number. It is not uncommon for people entering information for records to leave off the area code. To accommodate this, the database system generates a second value from the normalized value of a USA telephone, in which the second value has the area code removed. Both values are used when the database system builds the corresponding tries.

After the database system builds a trie during the build phase, the database system uses the trie at index time as follows. Suppose the database system is indexing record r on a particular field having a prefix structure for which its trie has been built. First, the database system normalizes this field's value in r, and tokenizes it the same way as in the build phase. Next, if the database system needs to derive additional token value sequences from this, the database system does so, such as generating a value without the area code for USA telephone phone numbers. For each token value sequence (in most cases there is only one), the database system references the corresponding trie to identify the shortest prefix p with a sufficiently small post-list size. The database system adds the record r to the prefix p's post-list. The database system also marks the node in the trie at which the prefix p ends with a tag indicating that this prefix was indexed. The database system will use this tag at lookup time.

By using the prefix p as the key, the database system will identify any record whose field value starts with this prefix. However if there are fuzzy variations (such as spelling errors) inside of the prefix p itself, the database system may not identify a matching record. Therefore, the database system focuses on the following four operators to improve recall for such fuzzy variations: a transposition operator, which randomly exchanges adjacent tokens, a blurred-substitution operator, which replaces a random token by a place-holder, an insertion operator, which inserts a place-holder token at a random position, and a deletion operator, which deletes a token at random position. After applying any of these operators to the prefix p, the database system generates a new key. The database system may have a parameter b that specifies a budget—the maximum number of such operations allowed—when indexing a field with a prefix structure. Let n denote the number of records in the database to be indexed. The database system allocates a budget of operations to the prefix p, allocating b/4n to each of the four operation types. The database system creates up to b/4n copies of the prefix p by transposing tokens at positions i and i+1, where i is selected randomly without replacement to be a position in the prefix p. The database system creates up to b/4n copies of the prefix p by blurring the token at the position i, where i is selected randomly without replacement to be a position in the prefix p. The database system creates up to b/4n copies of the prefix p by inserting a place-holder token after the token at the position i, where i is selected randomly without replacement to be a position in the prefix p. The database system creates up to b/4n copies of the prefix p by deleting a token at the position i, where i is selected randomly without replacement to be a position in the prefix p. If the database system creates less than b/n new keys for a prefix p, the database system may add the residual value towards the budget of the next field or the next record.

At look-up time, the database system follows the same process as at index time. Specifically, first the database system normalizes the field value, then tokenize the field value, then identifies the shortest prefix p in the corresponding trie whose post-list size is sufficiently small, then generates fuzzy variants of the prefix p as done in the indexing phase.

For example, the database system accesses records in a large database of organization-at-location records, such as the database provided by Dun & Bradstreet, creates a trie for the field organization name, references the organization name trie to identify organization name keys for the records, creates a trie for the field city name, and references the city name trie to identify city name keys for the records. When the database system attempts to determine whether a suspect record having non-null values for organization name and city name matches any of the database records, the database system needs to determine which of the two indices—organization name prefix or city name prefix—should be used in the look up phase. The post-list sizes of each the keys in the suspect record may be unacceptably large, such as when the organization name is Starbucks and the city name is New York City, as there are a large number of Starbucks locations and a large number of organizations are located in New York City. In this case, the database system may use the lookup organization-name-prefix=starbucks AND city-name-prefix=new york.

The post-list sizes of one the keys in the suspect record may be small enough, such as when the city is Topeka, as a small number of organizations are located in Topeka, and the organization name is Starbucks. In this case, the database system may use the lookup city-name-prefix=topeka, intentionally omitting the use of the organization-name-prefix to favor recall, as the organization name in the suspect record may include a spelling error—such as sturbucks.

The post-list sizes of each the keys in the suspect record may be small enough, such as when the city name is Topeka and the organization name is Frito-Lay. In this case, the database system may use the lookup organization-name-prefix=frito-lay OR city-name-prefix=topeka, which favors recall even more.

These examples imply that the database system should setup indices in such a way that at lookup time the database system can specify certain Boolean queries, such as ANDs and ORs, over various keys. The database system can store the indices in an enterprise search platform, such as SOLR, which enables the database system to leverage built-in mechanisms for specifying any Boolean query over the indices.

Given a suspect record, the database system needs to generate an efficient indexes query. Suppose the indexed keys in the suspect record are $x_1, x_2, \ldots x_k$. Here $x_i$ is the key for the attribute i. The tags in the tries are used to find where the keys end. Attributes are identified by position for notational convenience. First, the database system sorts the keys by their post-list sizes in non-decreasing order. The post-list sizes are the counts in the nodes in the tries that correspond to the keys. Let the index sequence in the sorted order be $\pi_1, \pi_2, \ldots \pi_k$, a certain permutation of $1, 2, \ldots k$, and the corresponding post-list sizes be $s_{\pi 1}, s_{\pi 2}, \ldots s_{\pi k}$. Let M denote the maximum candidate list size that is deemed acceptable. Either there exists the longest sequence of prefixes $\pi_1, \pi_2, \ldots \pi_j$ of $\pi_1, \pi_2, \ldots \pi_k$ so that the sum of the post-list sizes in this prefix sequence does not exceed M, or such a prefix sequence does not exist. If such a prefix sequence exists, the database system formulates the OR query, $x_{\pi 1}$ OR $x_{\pi 2}$ OR $\ldots$ OR $x_{\pi j}$.

If such a prefix sequence does not exist, the database system defines $P_{\pi i}=s_{\pi i}/n_{\pi i}$, $i=1, \ldots k$. Here $n_{\pi i}$ is the post-list size at the root of the trie of the attribute $\pi_i$. More simply, $n_{\pi i}=n$, where n is the number of records in the database that is indexed, which can be the number of documents in the SOLR index. Next, the database system identifies the shortest sequence of prefixes $\pi_1, \pi_2, \ldots \pi_j$ of $\pi_1, \pi_2, \ldots \pi_k$, satisfying $s_{\pi 1}*P_{\pi 2} \ldots *P_{\pi j} \leq M$
which estimates the candidate list sizes of intersections of keys under the assumption of independence of attributes. This assumption can sometimes be completely wrong.

For example, relevant data for matching suspect records is in the table below. Each cell has a value x/y where x is the attribute value and y the post-list size of the key with this same attribute value.

| Organization Name | City | Phone |
|---|---|---|
| Starbucks/20k | New York City/5k | 212/25k |
| Frito-Lay/50 | Topeka/50 | 785/600 |

Suppose M=500 and the database has 1,000,000 records. For the first suspect record, the database system generates the lookup query organization-name-prefix=starbucks AND city-name-prefix=new york, based on the estimated candidate list size of 100, derived from the equation 20,000 multiplied by 5,000 divided by 1,000,000 equals 100, which is less than the M of 500.

The independence assumption may be relaxed. For example, the attributes organization name and website are often correlated, such as when the website of all organization-at-location instances in the database in which the organization name is Starbucks will likely be starbucks.com. Therefore, the database system performing an AND operation using the keys of the organization-name-prefix and the website prefix will likely not reduce the candidate list size by much, if at all. Consequently, the database system can try to find a set of attributes that are as pairwise uncorrelated as possible, and/or can estimate the candidate set size more accurately when correlations are present. The input is the order of $\pi_1, \pi_2, \ldots \pi_k$, i.e. the keys are in order of non-decreasing post-list size.

$L \leftarrow \pi_1$ $s \leftarrow s_{\pi 1}$ while $|L|<k$

Find $\pi_j \text{ not in } L \square L$ which minimizes $(1/|L|)*\Sigma_{j \text{ in } L} m_{\pi j 1}$, where $m_{\pi j 1}$ is the mutual information [1] between attributes $\pi_j$ and 1

Add $\pi_j$ to $L$ $s \leftarrow s*f(P_{\pi j}, m_{jL})$

Break if $s<m$

Endwhile

When two attributes are (fully) independent, their mutual information is 0. In this case, f(P, m) needs to equal P. As dependence increases, mutual information starts increasing. So as m increases, f(P, m) needs to go to 1. The following function approximately produces this behavior.

$f(P,m)=\tan h((1+m)*P)$

When P is small, $f(P, 0)=\tan h(P) \approx P$. As m increases, tan $h((1+m)*P)$ approaches 1. From these constraints, the form and parameters of f(P, m) are derived. First, assume that the maximum value of the average mutual information $(1/|L|)*\Sigma m_{\pi j 1}$ is known, and denote it a.

f(P, 0) needs to =P and f(P, a)→1. The following function approximately achieves this.

$f(P,m)=(2/(1+e^{-\mu(m)*P})-1)$ where $\mu=1/a*\ln(1-2/1.99)$

The form of f(P, m) is a hyperbolic tangent, which is just $2\sigma-1$, where σ is the usual sigmoid. The slope μ(m) of this function needs to depend on m, being small when m is small and large when m is large. In more detail, f(P·m) equals P when m is 0 and has a sigmoidal curve passing through f(0, m)=0 and f(0, a)=0.99.

The database system can start with the attribute whose key has the smallest post-list size, and then try to find an attribute among the rest of the attributes that is maximally independent of this attribute. The database system can compute the new estimated result set size s after adding this attribute, and repeat the process. The mutual information of any two attributes can be estimated offline from the database in advance. The resulting matrix (of mutual information of pairs of attributes) will be small, since there are only a few attributes.

One use case is multi-tenant deduplicating, which involves de-duplicating objects—especially contacts, leads, and accounts—within each tenant or organization. For this purpose, the database system builds tenant or organization-specific indices to group together candidate duplicates in the organization's objects. Typical indexing algorithms used presently in production are parametrized, but these parameters are not exploited to use different settings for different organizations when appropriate. The disclosed database system can automatically tune the organization-specific indices to the organization's data, and moreover at a much more granular level than even possible with the approaches presently in production. Organization sizes, characterized by the number of account, contact, lead, and other objects in the organization, can vary greatly. There may be a large number of extremely small organizations having fewer than 1,000 records of each type. At the other extreme, there may be a small number of extremely large organizations, each having more than 10 million records of each type. The disclosed database system maximizes the duplicate detection rate while remaining with performance limits. Initially, for clarity of exposition, assume that each organization has the same amount of computing resources available (such as central processing units, memory, and disk usage) for deduplicating, regardless of its size. In this case, the disclosed database system will automatically use very coarse keys for extremely small organizations, and fine keys for extremely large organizations. This is because for extremely small organizations, even very coarse keys will remain performant. For extremely large organizations, very coarse keys will likely not remain performant, so the disclosed database system uses finer keys, which risks failing to detect some duplicates. This problem can of course be mitigated by providing very large organizations with much more computing resources than smaller organizations.

Another use case is for matching customer relationship management (CRM) records with data marketplace data, which is data vendors offering their data sets for purchase by organizations. Such data sets tend to be specialized for particular verticals or for particular types of cross-vertical data. For an organization that purchases such a data set, the database system can use matching to append the vendor's specialized data to appropriate objects stored by the organization. For example, an organization sells products and/or services to hospitals, and purchases a hospital-specific data set from a vendor in the data marketplace which contains niche attributes such as hospital beds. Via matching the accounts in the organization that are hospitals will automatically get matched to the correct hospital in this data set, and from this match important attributes in the vendor's data (such as the number of beds) will get appended to the CRM record where possible. A Data Marketplace will contain data of all sorts. In many cases, unknown attributes will be present. Ideally, the database system can index a new data set without any human involvement. Following an initial human configuration—which fields on a new data set to put prefix indices on—the database system takes over, automatically creating optimal individual indices—indices that maximize recall while remaining performant for look-ups, and automatically generating an efficient multi-index query for a suspect record dynamically, again maximizing recall while remaining performant.

If the database stores data about information technology companies, the zip codes for Silicon Valley will likely be associated with a larger numbers of information technology companies than the zip codes for Topeka, Kans. Therefore, the database system may use finer zip code keys, such as 5 digits, for the Silicon Valley information technology companies than for the Topeka information technology companies, for which the database system may use coarser zip code keys, such as the first 3 digits. Continuing this example, the database system uses the key 666 for the Topeka zip code 66604. While the database system cannot generate any fuzzy variation of a key for this zip code by transposition, the database system can generate substitution expansions, such as 66c04 and c6604. Therefore, in this example the 666 prefix will cover all variations in the last two digits while keeping the post-list size manageable, and the substitution expansions will cover errors in the first or third digit.

The database system normalizes the telephone number 515-123-4567 as the normalized number 5151234567, uses the normalized number to build a trie of telephone numbers, strips the area code to create the stripped number 1234567, and adds the stripped number to the trie of telephone numbers. At index time, the database system references the corresponding tries to identify the shortest acceptable prefix for the normalized number, such as 515123, and the stripped number, such as 123456. Next, the database system generates new fuzzy variations from each of these prefixes by applying the transposition, blurred-substitution, insertion, and deletion operators as previously described. For example, the database system generates the additional keys 155123, 551123, 515213, 515c23, 5c5123, 51123, 51512c3 for the prefix 515123.

Figure 2:
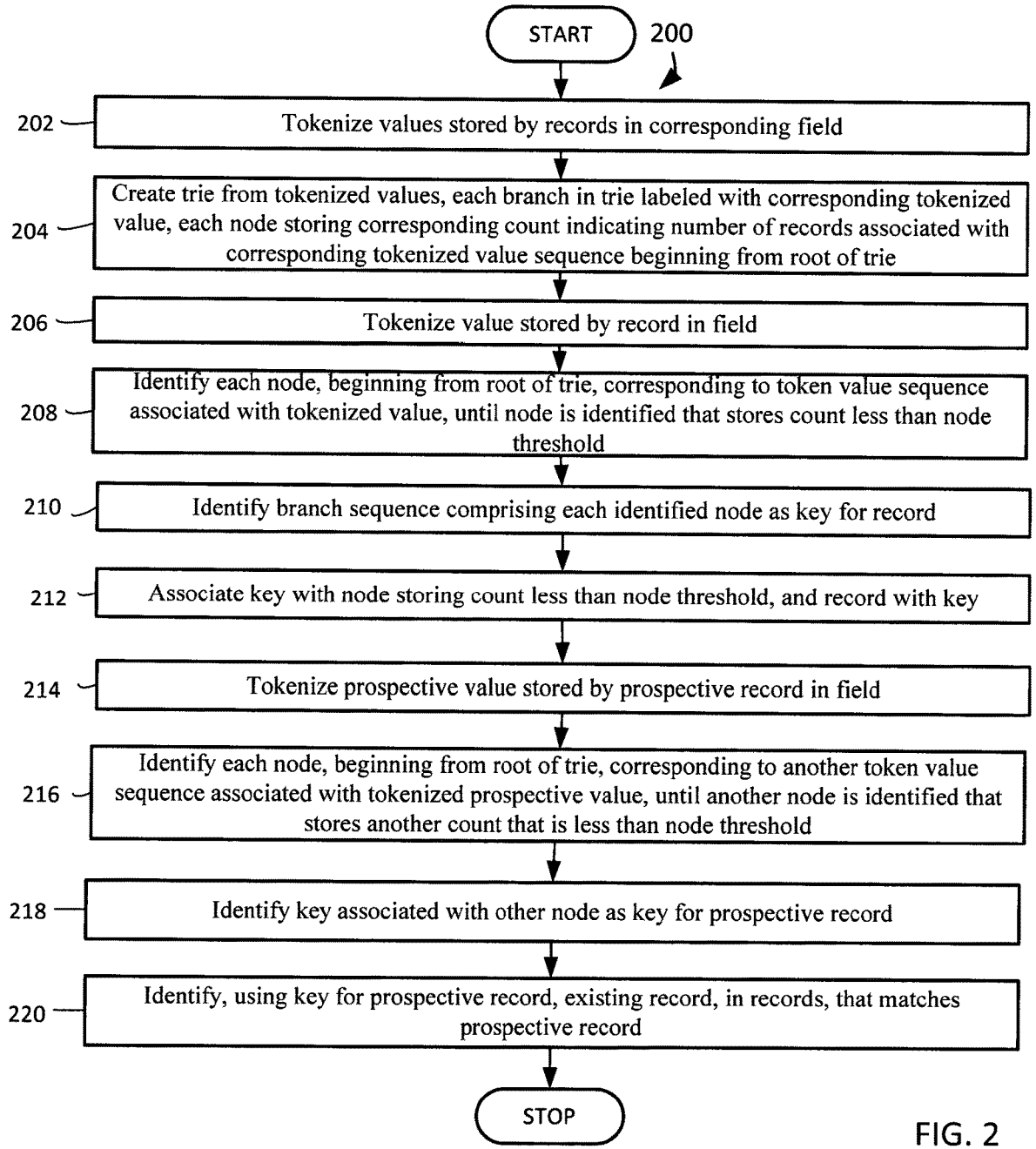
FIG. 2 is an operational flow diagram illustrating a high level overview of a method for optimized match keys for fields with prefix structure, in an embodiment.

FIG. 2 is an operational flow diagram illustrating a high level overview of a method 200 for optimized match keys for fields with prefix structure. Values stored in a corresponding field by records are tokenized, block 202. The database system tokenizes record field values to create a trie that will be used during record indexing and record lookup. For example and without limitation, this can include the database system tokenizing the organization names for database records, including tokenizing National Institute of Health as <national, institute, of health>, National Cancer Center as <national, cancer, center>, and National Science Board as <national, science, board>, Amazon Web Services as <amazon, web, services>, Amazon A9 as <amazon, a9>, Starbucks Coffee as <starbucks, coffee>, and Starbucks Manufacturing as <starbucks, manufacturing>. In an alternative example, the database system tokenizes city names for database records, including New York City as <new, york, city> and Topeka as <topeka>. A value can be the symbols on which operations are performed by a computer, being stored and transmitted in the form of electrical signals and recorded on magnetic, optical, or mechanical recording media. A record can be the storage of at least one value in a persistent form. A field type can be a part of a record, representing an item of data. Tokenizing can be the process of dividing a stream of text up into words, phrases, symbols, or other meaningful elements, which may be referred to as tokens.

Having tokenized the database records' values, a trie is built from the tokenized values, each branch in the trie labeled with a corresponding tokenized value, each node storing a corresponding count indicating a number of the records associated with a corresponding tokenized value sequence beginning from a root of the trie, block 204. The database system will use the trie during record indexing and record lookup. By way of example and without limitation, this can include the database system creating a trie that includes a branch labelled national from the trie root to a first sequential node; branches labelled institute, cancer, science from the first sequential node to the second sequential nodes; branches labelled of, center, and board from the second sequential nodes to the third sequential nodes, and a branch labelled health from a third sequential node to a fourth sequential node, as depicted in FIG. 1. The first sequential node stores the count 3 for the 3 organization names that include national, the second sequential nodes each store the count 1 for the 1 corresponding organization name that includes institute, cancer, or science, the third sequential nodes each store the count 1 for the 1 corresponding organization name that includes of, center, or board, and the fourth sequential node stores the count 1 for the 1 organization name that includes health.

The trie 100 in FIG. 1 also includes a branch labelled amazon from the trie root to a first sequential node; branches labelled web, a9 from the first sequential node to the second sequential nodes; and a branch labelled services from a second sequential node to a third sequential node. The first sequential node stores the count 2 for the 2 organization names that include amazon, the second sequential nodes each store the count 1 for the 1 corresponding organization name that includes web or a9, and the third sequential node stores the count 1 for the 1 organization name that includes services.

The trie 100 in FIG. 1 additionally includes a branch labelled starbucks from the trie root to a first sequential node, and branches labelled coffee, manufacturing from the first sequential node to the second sequential nodes. The first sequential node stores the count 2 for the 2 organization names that include starbucks, and the second sequential nodes each store the count 1 for the 1 corresponding organization name that includes coffee or manufacturing.

In an alternative example, the database system creates a trie from the tokenized values of the city name values stored in the database records' city name fields. A trie can be a tree-like ordered data structure that is used to store a dynamic set or associative array of values, where the search keys are usually strings. A branch can be a subdivision or a lateral extension extending from the main part of a tree or a trie. A node can be a connecting point at which lines or pathways in a tree or trie intersect or branch. A root can be the originating point of a tree or trie. A number and/or a count can be an arithmetical value, expressed by a word, symbol, or figure, representing a particular quantity and used in making calculations and for showing order in a series or for identification. Tokenized values can be symbols or text divided into words, phrases, symbols, or other meaningful elements. A tokenized value sequence can be a particular order in which divided words, phrases, symbols, or elements follow each other.

After the trie is built, a value stored in the field by a record is tokenized, block 206. The database system tokenizes a record's value to index the record, and uses the indexing during record lookup. In embodiments, this can include the database system tokenizing the organization name National Institute of Health as <national, institute, of health> for a database record during the indexing phase. In an alternative example, the database system tokenizes the city name New York City as <new, york, city> for a database record during the indexing phase.

Once the record's value is tokenized, each node is identified, beginning from the root of the trie, corresponding to a token value sequence associated with the tokenized value, until a node is identified that stores a count that is less than a node threshold, block 208. The database system identifies specific nodes during record indexing to identify keys used during record lookup. For example and without limitation, this can include the database system using these tokenized values to identify that a first sequential node stores the count 3 for the token value sequence national, and stop after identifying that a second sequential node stores the count 1 for the token value sequence national, institute, because this second sequential node's count 1 is less than the token threshold count of 2.5. In an alternative example, the database system stops after identifying that a second sequential node stores a count that is less than a token threshold count for the token value sequence new, york. A node threshold can be the magnitude or intensity that must be met or exceeded for a certain reaction, phenomenon, result, or condition to occur or be manifested.

Following the identification of nodes, a branch sequence comprising each identified node is identified as a key for the record, block 210. During record indexing, the database system identifies keys used during record lookup. By way of example and without limitation, this can include the database system identifying the branch sequence national, institute as the key for the database record that stores the organization name The National Institute of Health. In an alternative example, the database system identifies the branch sequence new, york as the key for the database record that stores the city name New York City. A branch sequence can be a particular order in which subdivisions or lateral extensions extending from the main part of a tree or a trie follow each other. A key can be a prefix of a field in a record that is used to lookup the record.

When the database system identifies the branch sequence that includes each identified node as the key for the record, the database system may also create a transposed key for the record by exchanging adjacent tokens in the key, create a substitution based key for the record by substituting a placeholder for a token in the key for the record, create an insertion based key for the record by inserting a placeholder in the key for the record, and/or create a deletion based key for the record by deleting a token in the key for the record. For example, when the database system identifies 515123 as the key for the database record that stores the telephone number 515-123-4567, the database system also creates the transposed key 551123, the substitution based key 595123, the insertion based key 5015123, and the deletion based key 51523 for the database record that stores the telephone number 515-123-4567. Creating fuzzy variations of keys for database records and for prospective records enables the database system to match these records even when the database records and/or the prospective records include errors. Although this example illustrates the database system creating one of each type of fuzzy variation key for the key, the database system may create any number of each type of fuzzy variation key for the key. For example, if the database system has a fuzzy variation budget of 12,000,000 and stores 1,000,000 records, then the database system creates a total of 12 fuzzy variations (12,000,000 divided by 1,000,000) for each key, such as creating 3 transposed keys, 3 substitution based keys, 3 insertion based keys, and 3 deletion based keys for each key.

Once the key is identified, the key is associated with the node storing the count less than the node threshold, and the record is associated with the key, box 212. The database system uses the key to identify matching records during record lookup. In embodiments, this can include the database system tagging the node after the institute branch with the key national institute, and adding the database record that stores the organization name The National Institute of Health to a list of records for the key national institute, and to the lists of records for any corresponding fuzzy variation keys. In an alternative example, the database system tags the node after the york branch with the key new york, and adds the database record that stores the city name New York City to a list of records for the key new york, and to the lists of records for any corresponding fuzzy variation keys.

When record indexing is completed, a prospective value stored in the field by a prospective record is tokenized, block 214. The database system tokenizes a prospective record's field value to identify matching records based on the tokenized values. For example and without limitation, this can include the database system tokenizing the organization name National Institute of Hlth as <national, institute, of hlth> for a prospective record during a lookup phase. In an alternative example, the database system tokenizes the city name New York City as <new, York, city> for a prospective record during the lookup phase. A prospective record can be at least one stored value that could potentially be stored in a database. A prospective value can be a symbol that could potentially be stored in a database of records.

Following the tokenizing of the prospective value, each node is identified, beginning from the root of the trie, corresponding to another token value sequence associated with the tokenized prospective value, until another node is identified that stores another count that is less than the node threshold, block 216. The database system identifies specific nodes to identify a key for the prospective record. By way of example and without limitation, this can include the database system using these tokenized values to identify that a first sequential node stores the count 3 for the token value sequence national, and stop after identifying that a second sequential node stores the count 1 for the token value sequence national, institute, because this second sequential node's count 1 is less than the threshold count of 2.5 In an alternative example, the database system stops after identifying that a second sequential node stores a count that is less than a token threshold count for the token value sequence new, york.

Having identified the other node, a key associated with the other node is identified as a key for the prospective record, block 218. The database system uses the key for the identified node as the key for the prospective record. In embodiments, this can include the database system identifying the branch sequence national, institute as the key for the prospective record that stores the organization name The National Institute of Hlth. In an alternative example, the database system identifies the branch sequence new, york as the key for the prospective record that stores the city name New York City.

When the database system identifies the key associated with the other node as the key for the prospective record, the database system may also identify another key associated with another corresponding field in the prospective record as another key for the prospective record. For example, the database system identifies starbucks as a key for the prospective record that stores the organization name Starbucks, identifies new york as a key for the same prospective record, which stores the city name New York City, and identifies the 212 as a key for the same prospective record, which stores the phone number 212-123-4567. In another example, the database system identifies frito as a key for the prospective record that stores the organization name Frito-Lay, identifies topeka as a key for the same prospective record, which stores the city name Topeka, and identifies 785 as a key for the same prospective record, which stores the phone number 785-345-6789.

When the database system identifies the key associated with the other node as the key for the prospective record, the database system may also create a transposed key for the prospective record by exchanging adjacent tokens in the key for the prospective record, create a substitution based key for the prospective record by substituting a placeholder for a token in the key for the prospective record, create an insertion based key for the prospective record by inserting a placeholder in the key for the prospective record, and/or create a deletion based key for the prospective record by deleting a token in the key for the prospective record. For example, when the database system identifies 515123 as the key for the database record that stores the telephone number 515-123-4568, the database system also creates the transposed key 551123, the substitution based key 595123, the insertion based key 5015123, and the deletion based key 51523 for the database record that stores the telephone number 515-123-4568. Creating fuzzy variations of keys for database records and for prospective records enables the database system to match these records even when the database records and/or the prospective records include errors. Although this example illustrates the database system creating one of each type of fuzzy variation key for the key, the database system may create any number of each type of fuzzy variation key for the key. For example, if the database system has a fuzzy variation budget of 12,000,000 and stores 1,000,000 records, then the database system creates a total of 12 fuzzy variations (12,000,000 divided by 1,000,000) for each key, such as creating 3 transposed keys, 3 substitution based keys, 3 insertion based keys, and 3 deletion based keys for each key.

After the key is identified for the prospective record, the key for the prospective record is used to identify an existing record, in the records, which matches the prospective record, block 220. For example and without limitation, this can include the database system using the key national institute for the prospective record to identify that the database record that stores the organization name The National Institute of Health matches the prospective record that stores the organization name The National Institute of Hlth. When the database system identifies the key national institute for the database record that stores the organization name The National Institute of Hlth, the key national institute has a list of records that include the database record that stores the organization name The National Institute of Health, which enables the database system to efficiently match these two records. The database system is able to identify these records as candidates for matching, even though their organization names did not match exactly, using a key based on only the first 2 of the prospective record's 4 tokenized values. An existing record can be at least one value that is already stored in the database. Matching records can be stored values that correspond to each other in some essential respect.

When the database system identifies the existing record that matches the prospective record, the database system may combine records associated with the key for the prospective record with other records associated with the other key associated with the other corresponding field in the prospective record. For example, the database system combines records in the starbucks key's list with records in the new york key's list with records in the 212 key's list. In another example, the database system combines records in the frito key's list with records in the topeka key's list with records in the 785 key's list.

In order to combine records associated with the key with other records associated with the other key, the database system can determine whether a sum of a count of the records associated with the key with another count of the records associated with the other key exceeds a record threshold. For example, the database system identifies that the starbucks key's list includes 20,000 records, the new york key's list includes 5,000 records, and the 212 key's list includes 25,000 records. Then the database system sorts these counts in non-decreasing order. For example, the database system sorts these counts as 5,000 for the new york key, 20,000 for the starbucks key, and 25,000 for the 212 key. Next, the database system sums as many of these counts as possible, until the sum exceeds a key threshold. For example, the database system determines that the smallest count 5,000 exceeds the record threshold value of 500, such that any sum of these counts exceeds the key threshold. If the sum of the count of the records associated with the key with the other count of the records associated with the other key does not exceed the record threshold, the database system can use a Boolean OR function to combine the records associated with the key with the other records associated with the other key. If the sum of the count of the records associated with the key with the other count of the records associated with the other key exceeds the record threshold, the database system can use a Boolean AND function to combine the records associated with the key with the other records associated with the other key. Since the sum of these counts exceeds the record threshold value of 500, the database system uses the Boolean AND function to combine 5,000 records in the new york key's list with the 20,000 records in the starbucks key's list. Since the database system estimates that such a use of the new york key's list and the starbucks key's list will result in 100 matching records (5,000*20,000/1,000,000=100), and 100 matching records does not exceed the target of 500 matching records, then the database system does not have to use the Boolean AND function with the 212 key's list to reduce the estimated number of matching records further.

In another example, the database system identifies that the frito key's list includes 50 records, the topeka key's list includes 50 records, and the 785 key's list includes 600 records. Then the database system sorts these counts as 50 for the frito key, 50 for the topeka key, and 600 for the 785 key. Next, the database system determines that the smallest count 50 plus the second smallest count 50 does not exceed the record threshold value of 500. However, since the largest count 600 exceeds the record threshold of 500 by itself, the database system does not include the largest count in the sum. Since the sum of the two smallest counts does not exceed the record threshold value of 500, the database system uses the Boolean OR function to combine 50 records in the frito key's list with the 50 records in the topeka key's list, which favors recall.

The method 200 may be repeated as desired. Although this disclosure describes the blocks 202-220 executing in a particular order, the blocks 202-220 may be executed in a different order. In other implementations, each of the blocks 202-220 may also be executed in combination with other blocks and/or some blocks may be divided into a different set of blocks.

System Overview

Figure 3:
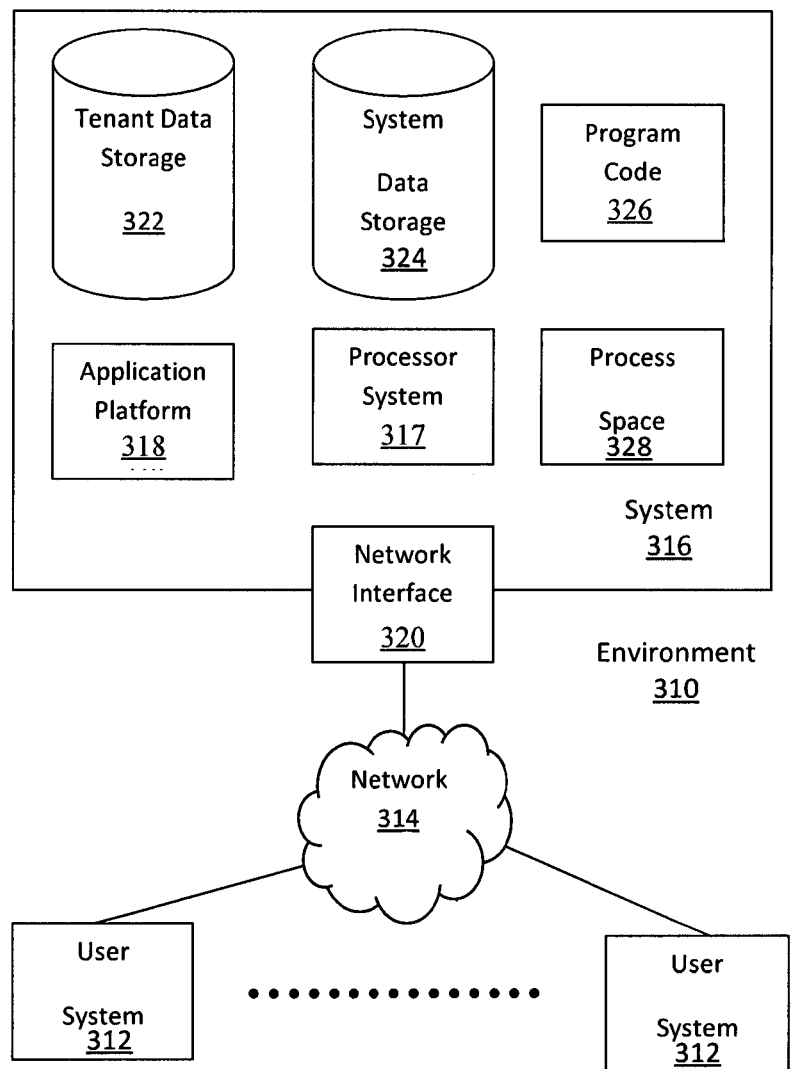
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
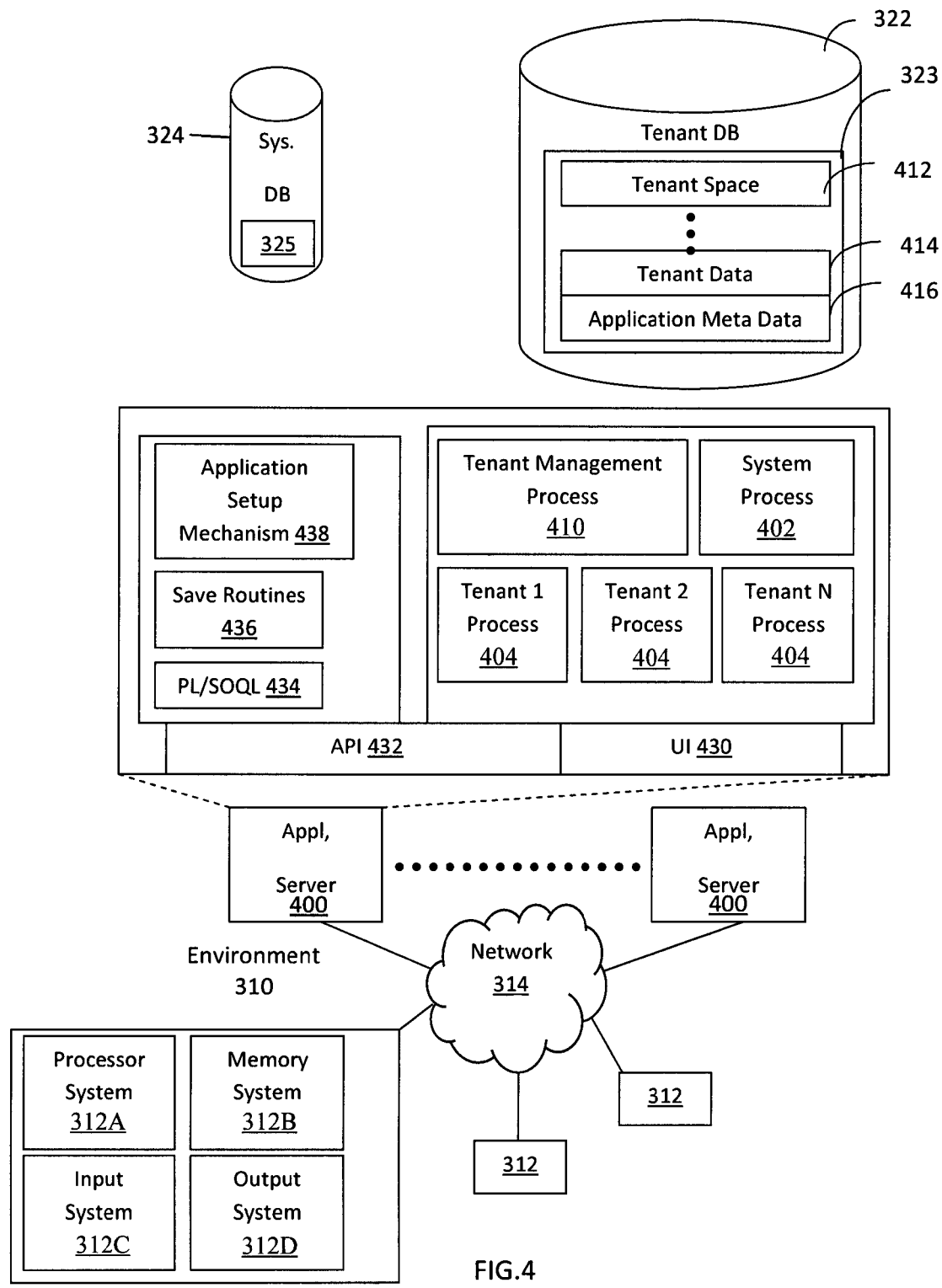
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414.

Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for optimized match keys for fields with prefix structure, the system comprising:
    one or more processors; and
    a non-transitory computer readable medium storing a plurality of instructions, which when executed, cause the one or more processors to:
    tokenize, by a database system, values stored in a field by a plurality of records;
    create, by the database system, a trie from the tokenized values, each branch in a trie labeled with one of the tokenized values, each node storing a count indicating a number of the plurality of records associated with a tokenized value sequence beginning from a root of the trie;
    tokenize, by the database system, a value stored in the field by one of the plurality of records;
    identify, by the database system, each node, beginning from the root of the trie, corresponding to a token value sequence associated with the tokenized value, until a node is identified that stores a count less than a node threshold;
    identify, by the database system, a branch sequence comprising each identified node as a key for the record;
    associate, by the database system, the key with the node storing the count less than the node threshold, and the record with the key;
    tokenize, by the database system, a prospective value stored in the field by a prospective record;
    identify, by the database system, each node, beginning from the root of the trie, corresponding to another token value sequence associated with a tokenized prospective value, until another node is identified that stores another count that is less than the node threshold;
    identify, by the database system, a key associated with the other node as a key for the prospective record; and
    identify, by the database system, using the key for the prospective record, an existing record of the plurality of records that matches the prospective record.

2. The system of claim 1, wherein identifying the key associated with the other node as the key for the prospective record comprises identifying another key associated with another corresponding field in the prospective record as the other key for the prospective record, and identifying the existing record that matches the prospective record comprises combining records associated with the key for the prospective record with other records associated with the other key associated with the other corresponding field in the prospective record.

3. The system of claim 2, wherein combining the records associated with the key with the other records associated with the other key comprises:
determining whether a sum of a count of the records associated with the key with another count of the records associated with the other key exceeds a record threshold;
using a Boolean AND function for combining the records associated with the key with the other records associated with the other key in response to a determination that the sum of the count of the records associated with the key with the other count of the records associated with the other key exceeds the record threshold; and
using a Boolean OR function for combining the records associated with the key with the other records associated with the other key in response to a determination that the sum of the count of the records associated with the key with the other count of the records associated with the other key does not exceed the record threshold.

4. The system of claim 1, wherein at least one of identifying the branch sequence comprising each identified node as the key for the record comprises creating a transposed key for the record by exchanging adjacent tokens in the key for the record, and identifying the key associated with the other node as the key for the prospective record comprises creating a transposed key for the prospective record by exchanging adjacent tokens in the key for the prospective record.

5. The system of claim 1, wherein at least one of identifying the branch sequence comprising each identified node as the key for the record comprises creating a substitution based key for the record by substituting a placeholder for a token in the key for the record, and identifying the key associated with the other node as the key for the prospective record comprises creating a substitution based key for the prospective record by substituting a placeholder for a token in the key for the prospective record.

6. The system of claim 1, wherein at least one of identifying the branch sequence comprising each identified node as the key for the record comprises creating an insertion based key for the record by inserting a placeholder in the key for the record, and identifying the key associated with the other node as the key for the prospective record comprises creating an insertion based key for the prospective record by inserting a placeholder in the key for the prospective record.

7. The system of claim 1, wherein at least one of identifying the branch sequence comprising each identified node as the key for the record comprises creating a deletion based key for the record by deleting a token in the key for the record, and identifying the key associated with the other node as the key for the prospective record comprises creating a deletion based key for the prospective record by deleting a token in the key for the prospective record.

8. A computer program product comprising computer-readable program code to be executed by one or more processors when retrieved from a non-transitory computer-readable medium, the program code including instructions to:
tokenize, by a database system, values stored in a field by a plurality of records;
create, by the database system, a trie from the tokenized values, each branch in a trie labeled with one of the tokenized values, each node storing a count indicating a number of the plurality of records associated with a tokenized value sequence beginning from a root of the trie;
tokenize, by the database system, a value stored in the field by one of the plurality of records;
identify, by the database system, each node, beginning from the root of the trie, corresponding to a token value sequence associated with the tokenized value, until a node is identified that stores a count less than a node threshold;
identify, by the database system, a branch sequence comprising each identified node as a key for the record;
associate, by the database system, the key with the node storing the count less than the node threshold, and the record with the key;
tokenize, by the database system, a prospective value stored in the field by a prospective record;
identify, by the database system, each node, beginning from the root of the trie, corresponding to another token value sequence associated with a tokenized prospective value, until another node is identified that stores another count that is less than the node threshold;
identify, by the database system, a key associated with the other node as a key for the prospective record; and
identify, by the database system, using the key for the prospective record, an existing record of the plurality of records that matches the prospective record.

9. The computer program product of claim 8, wherein identifying the key associated with the other node as the key for the prospective record comprises identifying another key associated with another corresponding field in the prospective record as the other key for the prospective record, and identifying the existing record that matches the prospective record comprises combining records associated with the key for the prospective record with other records associated with the other key associated with the other corresponding field in the prospective record.

10. The computer program product of claim 9, wherein combining the records associated with the key with the other records associated with the other key comprises:
determining whether a sum of a count of the records associated with the key with another count of the records associated with the other key exceeds a record threshold;
using a Boolean AND function for combining the records associated with the key with the other records associated with the other key in response to a determination that the sum of the count of the records associated with the key with the other count of the records associated with the other key exceeds the record threshold; and
using a Boolean OR function for combining the records associated with the key with the other records associated with the other key in response to a determination that the sum of the count of the records associated with the key with the other count of the records associated with the other key does not exceed the record threshold.

11. The computer program product of claim 8, wherein at least one of identifying the branch sequence comprising each identified node as the key for the record comprises creating a transposed key for the record by exchanging adjacent tokens in the key for the record, and identifying the key associated with the other node as the key for the prospective record comprises creating a transposed key for the prospective record by exchanging adjacent tokens in the key for the prospective record.

12. The computer program product of claim 8, wherein at least one of identifying the branch sequence comprising each identified node as the key for the record comprises creating a substitution based key for the record by substituting a placeholder for a token in the key for the record, and identifying the key associated with the other node as the key for the prospective record comprises creating a substitution based key for the prospective record by substituting a placeholder for a token in the key for the prospective record.

13. The computer program product of claim 8, wherein at least one of identifying the branch sequence comprising each identified node as the key for the record comprises creating an insertion based key for the record by inserting a placeholder in the key for the record, and identifying the key associated with the other node as the key for the prospective record comprises creating an insertion based key for the prospective record by inserting a placeholder in the key for the prospective record.

14. The computer program product of claim 8, wherein at least one of identifying the branch sequence comprising each identified node as the key for the record comprises creating a deletion based key for the record by deleting a token in the key for the record, and identifying the key associated with the other node as the key for the prospective record comprises creating a deletion based key for the prospective record by deleting a token in the key for the prospective record.

15. A method comprising:
   tokenizing, by a database system, values stored in a field by a plurality of records;
   creating, by the database system, a trie from the tokenized values, each branch in a trie labeled with one of the tokenized values, each node storing a count indicating a number of the plurality of records associated with a tokenized value sequence beginning from a root of the trie;
   tokenizing, by the database system, a value stored in the field by one of the plurality of records;
   identifying, by the database system, each node, beginning from the root of the trie, corresponding to a token value sequence associated with the tokenized value, until a node is identified that stores a count less than a node threshold;
   identifying, by the database system, a branch sequence comprising each identified node as a key for the record;
   associating, by the database system, the key with the node storing the count less than the node threshold, and the record with the key;
   tokenizing, by the database system, a prospective value stored in the field by a prospective record;
   identifying, by the database system, each node, beginning from the root of the trie, corresponding to another token value sequence associated with a tokenized prospective value, until another node is identified that stores another count that is less than the node threshold;
   identifying, by the database system, a key associated with the other node as a key for the prospective record; and
   identifying, by the database system, using the key for the prospective record, an existing record of the plurality of records that matches the prospective record.

16. The method of claim 15, wherein identifying the key associated with the other node as the key for the prospective record comprises identifying another key associated with another corresponding field in the prospective record as the other key for the prospective record, and identifying the existing record that matches the prospective record comprises combining records associated with the key for the prospective record with other records associated with the other key associated with the other corresponding field in the prospective record, wherein combining the records associated with the key with the other records associated with the other key comprises:
   determining whether a sum of a count of the records associated with the key with another count of the records associated with the other key exceeds a record threshold;
   using a Boolean AND function for combining the records associated with the key with the other records associated with the other key in response to a determination that the sum of the count of the records associated with the key with the other count of the records associated with the other key exceeds the record threshold; and
   using a Boolean OR function for combining the records associated with the key with the other records associated with the other key in response to a determination that the sum of the count of the records associated with the key with the other count of the records associated with the other key does not exceed the record threshold.

17. The method of claim 15, wherein at least one of identifying the branch sequence comprising each identified node as the key for the record comprises creating a transposed key for the record by exchanging adjacent tokens in the key for the record, and identifying the key associated with the other node as the key for the prospective record comprises creating a transposed key for the prospective record by exchanging adjacent tokens in the key for the prospective record.

18. The method of claim 15, wherein at least one of identifying the branch sequence comprising each identified node as the key for the record comprises creating a substitution based key for the record by substituting a placeholder for a token in the key for the record, and identifying the key associated with the other node as the key for the prospective record comprises creating a substitution based key for the prospective record by substituting a placeholder for a token in the key for the prospective record.

19. The method of claim 15, wherein at least one of identifying the branch sequence comprising each identified node as the key for the record comprises creating an insertion based key for the record by inserting a placeholder in the key for the record, and identifying the key associated with the other node as the key for the prospective record comprises creating an insertion based key for the prospective record by inserting a placeholder in the key for the prospective record.

20. The method of claim 15, wherein at least one of identifying the branch sequence comprising each identified node as the key for the record comprises creating a deletion based key for the record by deleting a token in the key for the record, and identifying the key associated with the other node as the key for the prospective record comprises creating a deletion based key for the prospective record by deleting a token in the key for the prospective record.

* * * * *